(12) United States Patent
Aoki et al.

(10) Patent No.: US 6,256,552 B1
(45) Date of Patent: Jul. 3, 2001

(54) METHOD FOR SETTING TOOL-BASED WORKING CONDITION IN OFF-LINE TEACHING

(75) Inventors: Shinji Aoki, Sayama; Masakatsu Kaneko, Hanno, both of (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/146,071

(22) Filed: Sep. 2, 1998

(30) Foreign Application Priority Data

Sep. 10, 1997 (JP) .................................................. 9-245261

(51) Int. Cl.⁷ .................................................. G06F 19/00
(52) U.S. Cl. ............................................ 700/175; 700/179
(58) Field of Search ................................. 700/175, 179, 700/150, 160, 172, 95, 96, 169, 182, 183

(56) References Cited

U.S. PATENT DOCUMENTS

| 4,561,776 | * | 12/1985 | Pryor ........................................ 356/72 |
| 4,998,050 | * | 3/1991 | Nishiyama et al. .................. 700/248 |
| 5,327,057 | * | 7/1994 | Kishi et al. ...................... 318/568.11 |
| 5,798,928 | * | 8/1998 | Niwa ..................................... 700/180 |
| 5,917,726 | * | 6/1999 | Pryor ....................................... 700/95 |

FOREIGN PATENT DOCUMENTS

| 5-27828 | 2/1993 | (JP) . |
| 5-289730 | 11/1993 | (JP) . |
| 6-114769 | 4/1994 | (JP) . |
| 6-274213 | 9/1994 | (JP) . |
| 7-191738 | 7/1995 | (JP) . |
| 7230313 | 8/1995 | (JP) . |
| 7-325611 | 12/1995 | (JP) . |
| 22520324 | 5/1996 | (JP) . |
| 81-174454 | 7/1996 | (JP) . |
| 8-286722 | 11/1996 | (JP) . |
| 8-286726 | 11/1996 | (JP) . |

* cited by examiner

*Primary Examiner*—William Grant
*Assistant Examiner*—Chad Rapp
(74) *Attorney, Agent, or Firm*—Birch, Stewart, Kolasch & Birch, LLP

(57) ABSTRACT

A method for setting a tool-based working condition in off-line teaching makes it possible to automatically set an optimum tool-based working condition while referring to specifications of a tool and workpiece-based working conditions so that reduced operation time required for the off-line teaching is efficiently realize. The method comprises steps of designating a welding point on CAD data of a workpiece; a step of retrieving one or more part codes concerning the welding point; a step of obtaining a combination of attribute codes necessary for the welding concerning the retrieved one or more part codes; a step of deciding a workpiece-based working condition on the basis of the obtained combination of attribute codes; a step of judging whether or not the decided workpiece-based working condition is included in specified specifications of a tool; and a step of retrieving a tool-based working condition suitable for the workpiece-based working condition from the specifications of the tool if the workpiece-based working condition is included in the specifications of the tool, so that teaching data is reflected thereby.

7 Claims, 22 Drawing Sheets

FIG. 2

PART ATTRIBUTE TABLE (26)

|  | PART CODE | ATTRIBUTE CODE ||
|---|---|---|---|
|  |  | MATERIAL QUALITY CODE | PLATE THICKNESS CODE |
| 0 RECORD | 00001 | M1 | H1 |
| 1 RECORD | 00002 | M2 | H1 |
| ⋮ | | | |

FIG. 3

WORKPIECE-BASED WORKING CONDITION TABLE (28)

| ATTRIBUTE CODE | ATTRIBUTE CODE | WELDING CURRENT VALUE (A) | ELECTRIC POWER-APPLYING TIME (S) | PRESSURE-APPLYING FORCE (kgf) |
|---|---|---|---|---|
| M1-H1 | M2-H1 | 200 | 2 | 350 |
| •••• | | | | |

0 RECORD
1 RECORD

FIG. 4

ADDRESS CONVERSION TABLE (30)

|  | PART CODE | PART CODE | HEAD STORAGE ADDRESS |
|---|---|---|---|
| 0 RECORD | 00001 | 00002 | XXXXX |
| 1 RECORD |  |  |  |
| | ⋮ | | |

FIG. 5

TOOL SPECIFICATION TABLE (36)

| TOOL CODE | MAXIMUM ALLOWABLE CURRENT VALUE (A) | PRESSURE-APPLYING FORCE (kgf) | RATIO OF USE (%) | PRESSURE-APPLYING SPEED (m/s) | RELEASE SPEED (m/s) | HEAD STORAGE ADDRESS |
|---|---|---|---|---|---|---|
| GUN1 | | | | | | |
| GUN2 | | | | | | |
| GUN3 | | | | | | |
| ••••• | | | | | | |

FIG. 6

TOOL-BASED WORKING CONDITION TABLE (38)

| CONDITION NUMBER | MINIMUM ALLOWABLE CURRENT VALUE (A) | MAXIMUM ALLOWABLE CURRENT VALUE (A) | RELEASE TIME (S) | PRESSURE-APPLYING TIME (S) |
|---|---|---|---|---|
| 1 | | | | |
| 2 | | | | |
| 3 | | | | |
| · · · · | | | | |

FIG. 8

TEACHING DATA (D)

| STEP | X AXIS | Y AXIS | Z AXIS | U AXIS | V AXIS | W AXIS | CONDITION NUMBER |
|------|--------|--------|--------|--------|--------|--------|------------------|
| 0    | 0      | 100    | 200    | 300    | 400    | 500    | 5                |
| 1    |        |        |        |        |        |        |                  |
| 2    |        |        |        |        |        |        |                  |
| ....  |        |        |        |        |        |        |                  |

(X AXIS through W AXIS: POSITIONAL INFORMATION)

METHOD FOR SETTING TOOL-BASED WORKING CONDITION IN OFF-LINE TEACHING

BACKGROUND OF THE INVENTION

1. Field of the Invention

The present invention relates to a method for setting a working condition in off-line teaching to be preferably used to set, for example, a welding condition for a robot equipped with a welding gun.

2. Description of the Related Art

Recently, in order to apply a robot to a variety of workings, in general, a variety of tools are attached to a face plate of a robot arm to allow the robot to perform the workings.

In the meantime, there have been hitherto suggested a large number of teaching techniques directed to the robot as well as a large number of techniques for variously correcting teaching data used for such teaching techniques. For example, those suggested in relation to the teaching technique for the robot include a method in which information necessary for an employed robot working is dealt with in order to respond to the request of the user as accurately as possible while mitigating the load exerted on the user as less as possible (see Japanese Laid-Open Patent Publication No. 5-27828).

Those suggested in relation to the technique for correcting teaching data include, for example, a method in which it is possible to easily execute revision for the teaching point and correction for the teaching locus under the same operating condition as that used during playback even at a place separated from the working site so that the load on the operator is mitigated to perform the operation for revising the teaching (see Japanese Laid-Open Patent Publication No. 8-286726), a method in which any positional deviation can be corrected highly accurately and automatically for all positions of striking points (see Japanese Laid-Open Patent Publication No. 7-325611), a method in which the position of a robot is corrected by using a neural network (see Japanese Laid-Open Patent Publication No. 6-114769), a method in which a correcting operation sensually comprehensible for the operator can be performed when conversion data concerning the robot action is revised if any abnormal situation concerning the action range occurs in revised teaching data (see Japanese Laid-Open Patent Publication No. 5-289730), a method in which a repeated logical operation based on the modified Powel method is applied to respective factors of unknown variable matrix and constant matrix so that the accuracy is further improved and the operation speed is further increased in order to avoid any measurement on the rectangular coordinates and ensure the absolute positional accuracy of an arm-type articulated robot only by using the angle of rotation about the arm axis (see Japanese Laid-Open Patent Publication No. 6-274213), and a method in which correction is automatically made for any preset error concerning the constant and any preset error concerning the tool offset which are preset data for an articulated robot having a tool attached to a wrist of the robot (see Japanese Patent No. 2520324).

Those suggested in relation to the technique for setting the tool tip point include a method in which the tool tip point can be set in a desired posture in accordance with a simple procedure by using a simple setting jig even when no design data is available (see Japanese Laid-Open Patent Publication No. 7-191738). Those suggested for using CAD data include a method in which it is unnecessary for the operator to input initial preset data, working route data, and working action data one by one so that the amount of input performed by the operator is greatly decreased (see Japanese Laid-Open Patent Publication No. 8-286722). Those suggested in relation to the locus display include a method in which the relative positional relationship between a workpiece and a position of an acting actual tool can be recognized easily and accurately when the workpiece is retracted from a working position (see Japanese Laid-Open Patent Publication No. 8-174454).

When the off-line teaching technique as described above is applied to a robot equipped with a welding gun, it is indispensable to set the welding condition in addition to the teaching made for the tool tip. The welding condition includes, for example, the change (sequence) of the welding current in accordance with the passage of time, the peak value of the welding current, and the welding time.

However, in the case of the conventional off-line teaching technique, it is impossible to easily obtain information, for example, on the material quality and the plate thickness of the workpiece to be welded, during the process of the off-line teaching. Therefore, a problem arises in that it takes an extremely long time to decide all of the welding conditions for the workpiece.

For this reason, in the conventional technique, the operator temporarily sets an appropriate welding condition in view of the shape and the thickness of the workpiece. In such a procedure, when the off-line teaching data is downloaded to an actual robot, it is necessary to perform an operation for resetting the temporarily set welding condition in conformity with the actual robot, i.e., it is necessary to perform an operation for setting the welding condition again. Therefore, a problem arises in that such a process contrarily takes a long time.

Recently, a method is available, in which working conditions and attributes of the workpiece data are provided for respective elements to add a function to assist the off-line teaching operation. However, in this method, the working condition is decided by the operator by means of selection from those displayed on the monitor. Therefore, every time when the working condition is registered, it is necessary for the operator to select an optimum condition from several working conditions indicated in a table. As a result, a problem arises in that the operation is complicated. Further, this method greatly depends on the skill of the operator. Therefore, there has been a fear that it is difficult to set the optimum condition.

SUMMARY OF THE INVENTION

The present invention has been made taking the foregoing problems into consideration, an object of which is to provide a method for setting a tool-based working condition in off-line teaching, which makes it possible to automatically set an optimum tool-based working condition while referring to specifications of a tool and workpiece-based working conditions, and which makes it possible to efficiently realize reduced operation time required for the off-line teaching.

Another object of the present invention is to provide a method for setting a tool-based working condition in off-line teaching, which makes it possible to set a reasonable working condition in off-line, which makes it possible to decrease the resetting process based on the use of an actual robot as less as possible, and which makes it possible to greatly reduce the time and the number of steps required to perform the revising operation at the working site.

According to the present invention, there is provided a method for setting a tool-based working condition in off-line teaching, comprising a first step of designating, for a workpiece on CAD data, a working point for performing working for the workpiece; a second step of retrieving one or more parts concerning the designated working point; a third step of obtaining attributes necessary for the working concerning the retrieved one or more parts; a fourth step of deciding a workpiece-based working condition on the basis of the obtained attributes; and a fifth step of retrieving the tool-based working condition suitable for the workpiece-based working condition from specifications of a tool if the decided workpiece-based working condition is included in the specified specifications of the tool, so that teaching data is reflected thereby.

In the first step of the present invention, it is preferable that the working point is designated by an operator by using a pointing device such as a mouse for an image of the workpiece displayed on a monitor. Thus, the tool-based working condition is automatically decided at the concerning working point. Therefore, it is possible to efficiently realize shortened operation time required for the off-line teaching.

The reasonable working condition can be set by using the off-line teaching apparatus. Accordingly, it is possible to decrease the resetting process based on the use of the actual robot as less as possible. Thus, it is possible to greatly reduce the time and the number of steps required to perform the revising operation at the working site.

It is preferable in the second step that one or more workpieces, which intersect a straight line drawn from coordinates of the working point in a working direction on the basis of coordinate data of the working point, are retrieved from the CAD data of the workpiece. Accordingly, the one or more workpieces concerning the working point are automatically deduced at the point of time at which the working point is designated. In this embodiment, it is desirable that a retrieval results is outputted as a name of the workpiece.

It is preferable that the third step further comprises the steps of using a part attribute table which makes it possible to refer to a plate thickness and a material quality of the part on the basis of a name of the part; and obtaining plate thicknesses and material qualities concerning the one or more parts retrieved in the second step while making collation with the part attribute table. In this embodiment, it is possible to automatically obtain the plate thicknesses and the material qualities of the respective parts concerning the working point on the basis of the names of the one or more parts retrieved in the second step.

It is preferable that the fourth step further comprises the steps of using a workpiece-based working condition table which has files corresponding to a number of combination patterns of the parts and which enables each of the files to refer to a working condition concerning a certain combination on the basis of a combination pattern of the material quality and the plate thickness; specifying the file in accordance with a combination of the one or more parts obtained in the second step, included in the workpiece-based working condition table; and retrieving and deciding the workpiece-based working condition from the specified file by using a key of a combination pattern of the plate thickness and the material quality obtained in the third step.

Accordingly, the file concerning the combination is retrieved on the basis of the combination pattern of the parts, from the workpiece-based working condition table. After that, the workpiece-based working condition is retrieved from the specified file on the basis of the combination pattern of the respective material qualities and the plate thicknesses of the parts concerning the combination.

In this embodiment, the workpiece-based working condition can be easily decided from the combination pattern of the parts concerning the welding point. Therefore, it is possible to achieve automatic setting of the workpiece-based working condition by using the software.

It is preferable that the fifth step further comprises the steps of comparing the workpiece-based working condition decided in the fourth step with the specifications of the tool of an objective robot; and using a tool-based working condition table in which the tool-based working conditions are registered in a numerical order if a result of comparison indicates that the decided workpiece-based working condition is included in the specifications of the tool, so that a number suitable for the decided workpiece-based working condition is extracted from the tool-based working condition table to record the number in the teaching data.

In this embodiment, any working condition, which is not appropriate for the specifications of the tool of the objective robot, is not set as the tool-based working condition. It is possible to automatically set the tool-based working condition which is appropriate for the workpiece-based working condition.

It is preferable that if there is no number which conforms to the decided workpiece-based working condition, in the tool-based working condition table, then a tool-based working condition, which is suitable for the decided workpiece-based working condition, is newly registered with the tool-based working condition table, and a new number designated during this process is recorded in the teaching data.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 illustrates the contents of a part attribute table;

FIG. 3 illustrates the contents of a workpiece-based working condition table;

FIG. 4 illustrates the contents of an address conversion table;

FIG. 5 illustrates the contents of a tool specification table;

FIG. 6 illustrates the contents of a tool-based working condition table;

FIG. 8 illustrates the contents of teaching data;

DESCRIPTION OF THE PREFERRED EMBODIMENTS

Explanation will be made below with reference to FIGS. 1 to 22 for an illustrative embodiment in which the method for setting the tool-based working condition or the working condition for the tool in off-line teaching according to the present invention is applied, for example, to an off-line teaching system for a robot equipped with a welding gun (hereinafter simply referred to as "off-line teaching system according to the embodiment").

Figure 1:
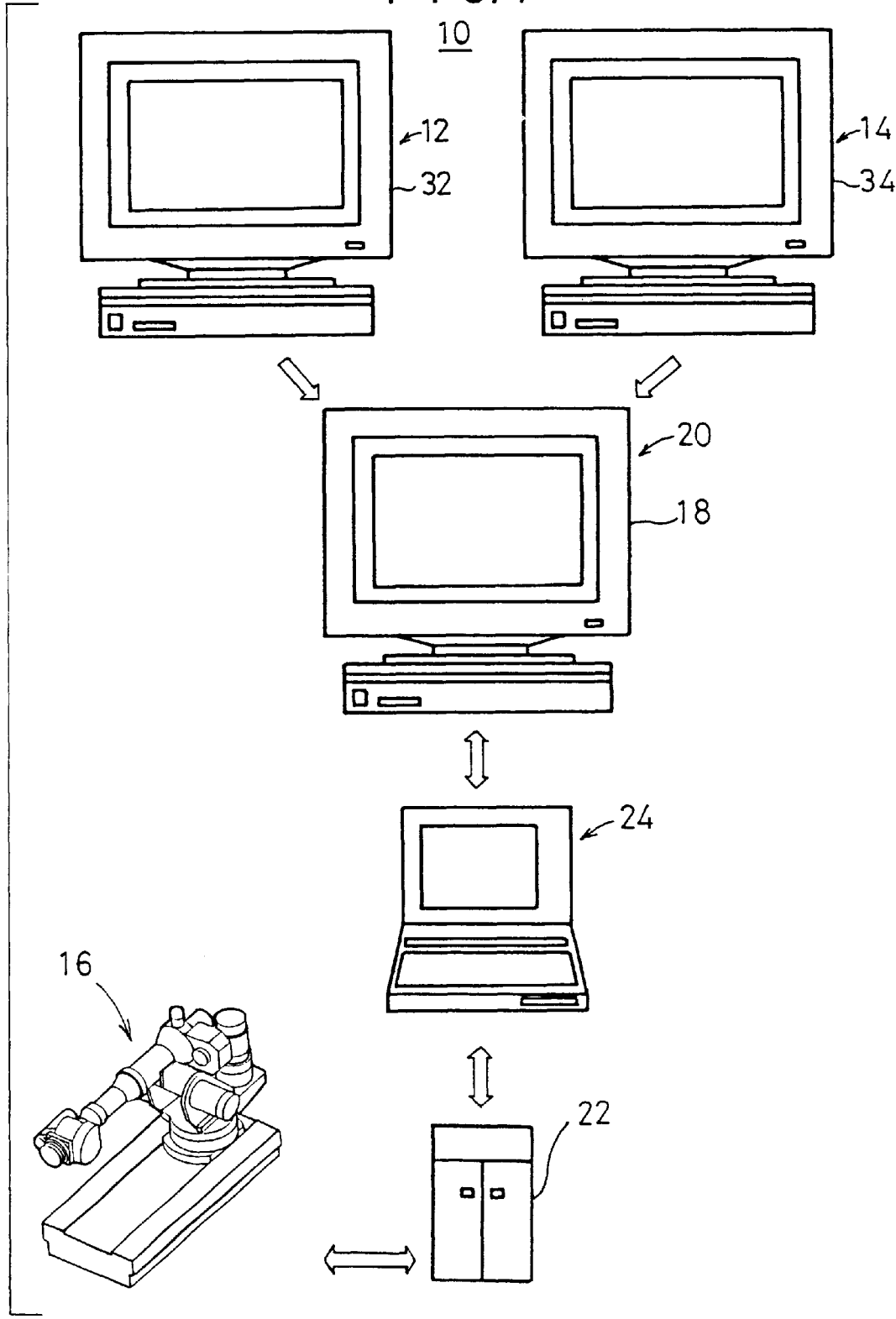
FIG. 1 shows an arrangement of an off-line teaching system according to an embodiment of the present invention.

As shown in FIG. 1, the off-line teaching system 10 according to the embodiment of the present invention comprises a workpiece-designing computer 12 for designing, for example, a workpiece to be welded, an equipment-designing computer 14 for designing, for example, tool specifications of a welding gun, an off-line teaching apparatus 20 for displaying a logical robot model simulated to an actual robot 16 on a screen of a monitor 18 to perform off-line teaching, a robot controller 22 for controlling the actual robot 16, and a data transfer apparatus 24 for downloading original teaching data prepared by using the off-line teaching apparatus 20 to the robot controller 22, and uploading teaching data revised and added by the robot controller 22 by using the actual robot 16 to the off-line teaching apparatus 20.

The workpiece-designing computer 12 is used, for example, to design a plurality of parts for constructing the workpiece by using a software CAD system, and it is used to prepare positional data concerning the position (welding point) at which the workpiece is subjected to welding. Especially, in the embodiment of the present invention, a part attribute table 26 (see FIG. 2), a workpiece-based working condition table 28 (see FIG. 3), and an address conversion table 30 (see FIG. 4) are prepared when the parts are designed and when the welding point is established.

The part attribute table 26 is prepared as shown in FIG. 2. That is, one record stores a code for indicating the part name (part code), a code for indicating the material quality (material quality code), and a code for indicating the plate thickness (plate thickness code). The part attribute table 26 comprises a large number of the records arranged therein. The part attribute table 26 is prepared every time when the parts for constructing the workpiece are designed on the monitor 32 of the workpiece-designing computer 12. The part codes and the attribute codes (the material quality codes and the plate thickness codes) concerning the parts as the design objectives are registered with the part attribute table 26.

As shown in FIG. 3, the workpiece-based working condition table 28 has files corresponding to a number of combinations of the parts at the welding point. In each of the files, one record stores a first attribute code, a second attribute code, a welding current value, an electric power-applying time, and a pressure-applying force. The workpiece-based working condition table 28 comprises a large number of the records arranged therein. The workpiece-based working condition table 28 is prepared every time when the welding point is set for the workpiece prepared on the monitor 32 of the workpiece-designing computer 12. The first attribute code, the second attribute code, the welding current value, the electric power-applying time, and the pressure-applying force concerning the combination of the parts upon the preparation are successively registered with the workpiece-based working condition table 28.

As shown in FIG. 4, the address conversion table 30 is arranged as a table in which the head storage address (relative logical address) of the file corresponding to the combination of the parts at the welding point included in the workpiece-based working condition table 28 is registered. An exemplary combination of parts and a head storage address are stored in one record.

On the other hand, the equipment-designing computer 14 is used, for example, to design various tools for constructing the welding gun by using a software CAD system. Especially, in the embodiment of the present invention, a tool specification table 36 (see FIG. 5) and a tool-based working condition table 38 (see FIG. 6) are prepared when the tool is designed.

The tool specification table 36 is prepared as shown in FIG. 5. That is, one record stores a code for indicating a tool name (tool code), a maximum allowable welding current value, a pressure-applying force, a ratio of use, a pressure-applying speed, a release speed, and a head storage address. The tool specification table 36 comprises a large number of the records arranged therein. The head storage address refers to a head storage address (relative logical address) of a file in which a tool-based working condition corresponding to the tool code is registered, of a large number of files for constructing the tool-based working condition table 38 as described later on.

As shown in FIG. 5, the tool specification table 36 is prepared every time when the equipment design is made for the tool of the welding gun on the monitor 34 of the equipment-designing computer 14. The tool code concerning the tool as the design objective, the maximum allowable welding current value, the pressure-applying force, the ratio of use, the pressure-applying speed, the release speed, and the head storage address are successively registered with the tool specification table 36.

As shown in FIG. 6, the tool-based working condition table 38 has files corresponding to a number of the equipped and designed tools. In each of the files, one record stores a maximum allowable welding current, a minimum allowable welding current, a release time, and a pressure-applying time. The tool-based working condition table 38 comprises a large number of the records arranged therein. The tool-based working condition table 38 is prepared every time when the specified tool is equipped and designed on the monitor 34 of the equipment-designing computer 14. Conditions corresponding to various workings are successively registered with the tool-based working condition table 38.

Figure 7:
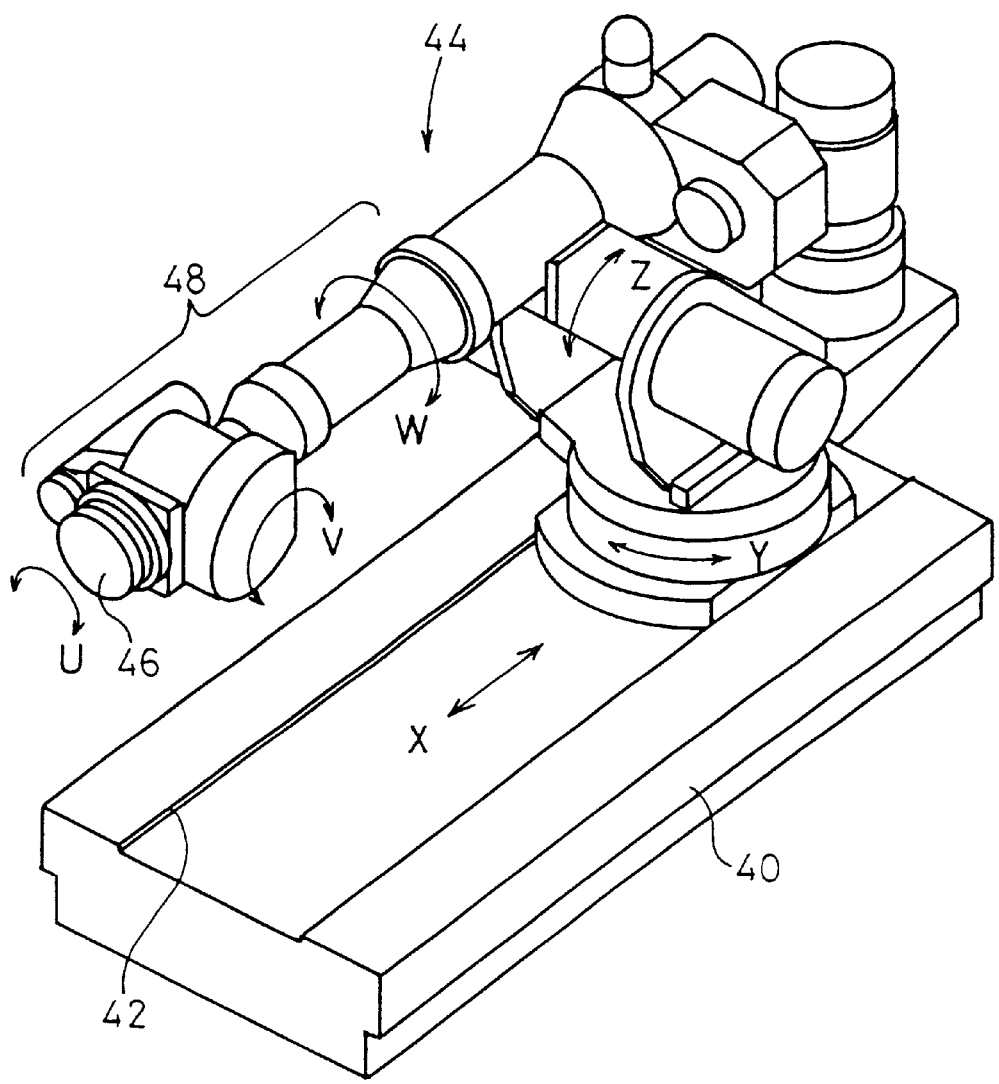
FIG. 7 shows a magnified view illustrating an example of an actual robot having six axes.

In this embodiment, it is assumed that the actual robot 16 is a six-axis (motor shaft) robot. As shown in FIG. 7, the actual robot 16 has an X axis for allowing the entire actual robot 16 to slide in a direction of the arrow X along rails 42 formed on an upper surface of a pedestal 40, a Y axis for rotating the entire actual robot 16 in a direction of the arrow Y, a Z axis for rotating an entire arm section 44 of the actual robot 16 in a direction of the arrow Z, a U axis for rotating a tool attachment section 46 disposed at the forward end of the arm section 44 in a direction of the arrow U, a V axis for rotating the tool attachment section 46 in a direction of the arrow V, and a W axis for rotating a first half 48 of the arm section 44 in a direction of the arrow W.

On the other hand, the data transfer apparatus 24 is composed of, for example, a personal computer containing HDD, which is connected with the off-line teaching apparatus 20 by means of, for example, a communication line.

As shown in FIG. 8, for example, the teaching data (including original data and data after revision) D have a data structure in which the positional information and the number of the working condition (condition number) are written for each of the steps.

The positional information is represented by a number of pulses obtained by using an encoder attached to each of the six-axis motor shafts. In an example shown in FIG. 8, it is demonstrated in the step 0 that the X axis is in a stop state, the Y axis is subjected to movement in an amount corresponding to 100 pulses, for example, in the clockwise direction, and the Z axis is subjected to movement in an amount corresponding to 200 pulses in the clockwise direction. In the same manner as described above, movement is made, for example, in the clockwise direction in amounts corresponding to 300 pulses for the U axis, 400 pulses for the V axis, and 500 pulses for the W axis respectively.

Figure 9:
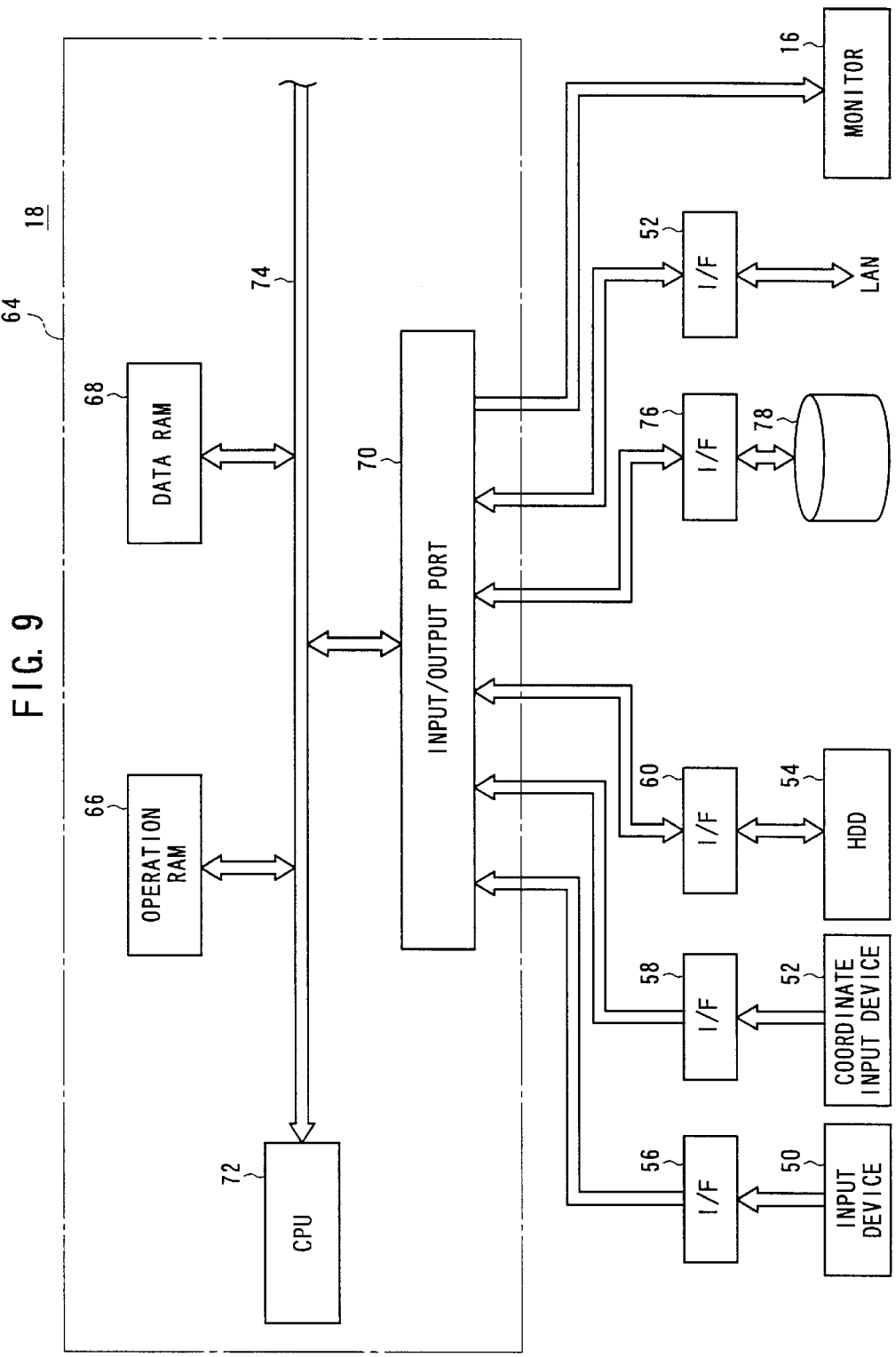
FIG. 9 shows a block diagram illustrating an arrangement of an off-line teaching apparatus.

As shown in FIG. 9, the off-line teaching apparatus 20 comprises a key input device 50 such as a keyboard, a coordinate input device 52 (pointing device) such as a mouse and a joystick, and a hard disk drive (HDD) 54 which are connected via interface (simply referred to as "I/F") circuits 56, 58, 60 respectively. The off-line teaching apparatus 20 is further connected with LAN to be used for delivering, for example, teaching data with respect to other off-line teaching apparatuses via an I/F circuit 62. The off-line teaching apparatus 20 further comprises the monitor 18 for displaying the teaching data incorporated via LAN and the teaching data prepared by using the off-line teaching apparatus 20.

The off-line teaching apparatus 20 has a control system 64 which comprises an operation RAM 66 for executing various programs (for example, teaching processing programs), a data RAM 68 for storing, for example, data supplied from external devices (for example, key input device 50, coordinate input device 52, and HDD 54) and data subjected to data processing based on various programs, an input/output port 70 for inputting/outputting data with respect to the external devices, and CPU (control unit and logical operation unit) 72 for controlling the various types of circuits.

The various types of circuits are subjected to data delivery between the respective circuits via a data bus 74 led from CPU 72, and they are controlled by CPU 72 respectively via an address bus and a control bus (both are not shown) led from CPU 72.

A data base 78 is connected via an I/F circuit 76 to the input/output port 70 of the off-line teaching apparatus 20. The respective tables are registered with the data base 78.

The off-line teaching system 10 according to the embodiment is incorporated with a teaching data-preparing and processing means (teaching data-preparing and processing program) 90 as a software for preparing original teaching data.

Figure 10:
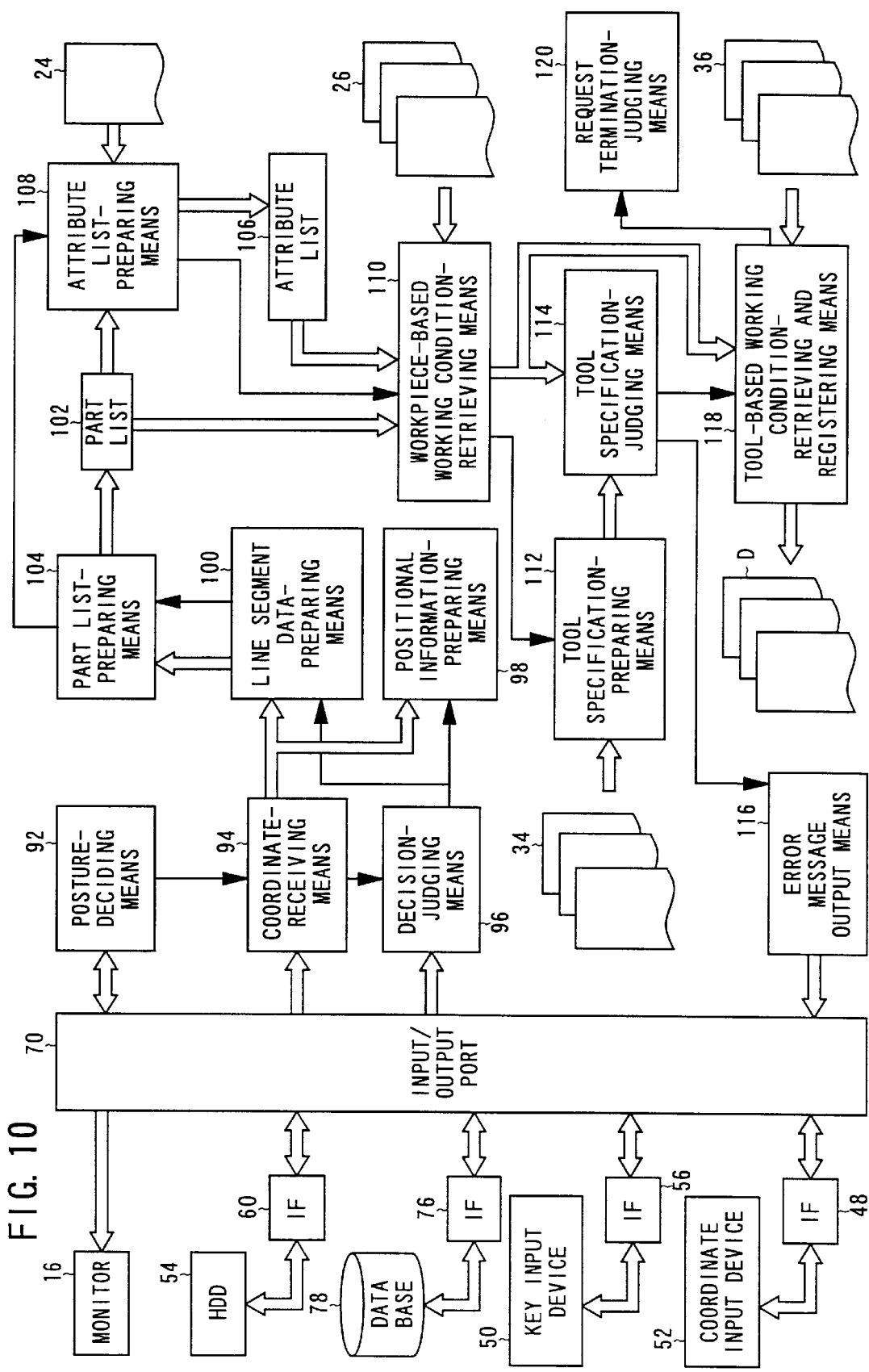
FIG. 10 shows a functional block diagram illustrating an arrangement of a teaching data-preparing and processing means.

As shown in FIG. 10, the teaching data-preparing and processing means 90 comprises a posture-deciding means 92 for deciding the posture of the logical robot model displayed on the monitor 18, a coordinate-receiving means 94 for receiving the coordinate data from the key input device 50 and the coordinate input device 52 if there is any data input interrupt, a decision-judging means 96 for judging whether or not the input data from the key input device 50 or the coordinate input device 52 is decided instruction concerning the welding point, a positional information-preparing means 98 for preparing positional information on the basis of the decided posture of the logical robot model and the coordinates decided as the welding point, a line segment data-preparing means 100 for determining line segment data between electrodes (a movable electrode 200 and a fixed electrode 202, see FIG. 22) obtained by drawing a line in a pressure-applying direction from the coordinates decided as the welding point, a part list-preparing means (subroutine) 104 for retrieving the part code on the CAD data included in the line segment data to successively make registration with a part list 102, an attribute list-preparing means (subroutine) 108 for retrieving the attribute code corresponding to the part code registered with the prepared part list 102 from the part attribute table 26 to successively make registration with an attribute list 106, a workpiece-based working condition-retrieving means (subroutine) 110 for retrieving the appropriate file from the workpiece-based working condition table 28 on the basis of the combination pattern of the part codes registered with the part list 102 and retrieving the workpiece-based working condition or the working condition for the workpiece from the appropriate file on the basis of the combination pattern of the attribute codes registered with the attribute list 106, a tool specification-retrieving means (subroutine) 112 for retrieving the specification data concerning the tool of the objective robot from the tool specification table 36, a tool specification-judging means 114 for judging whether or not the workpiece-based working condition retrieved by the workpiece-based working condition-retrieving means 110 is suitable for the specifications of the present tool, an error message output means 116 for outputting an error message to the monitor 18 if the retrieved workpiece-based working condition is not suitable for the specifications of the present tool, a tool-based working condition-retrieving and registering means (subroutine) 118 for newly preparing or retrieving the tool-based working condition suitable for the workpiece-based working condition from the file concerning the present tool included in the tool-based working condition table 38 and making registration with the teaching data D, and a request termination-judging means 120 for judging whether or not there is any termination of the request for preparation of the teaching data D.

Figure 11:
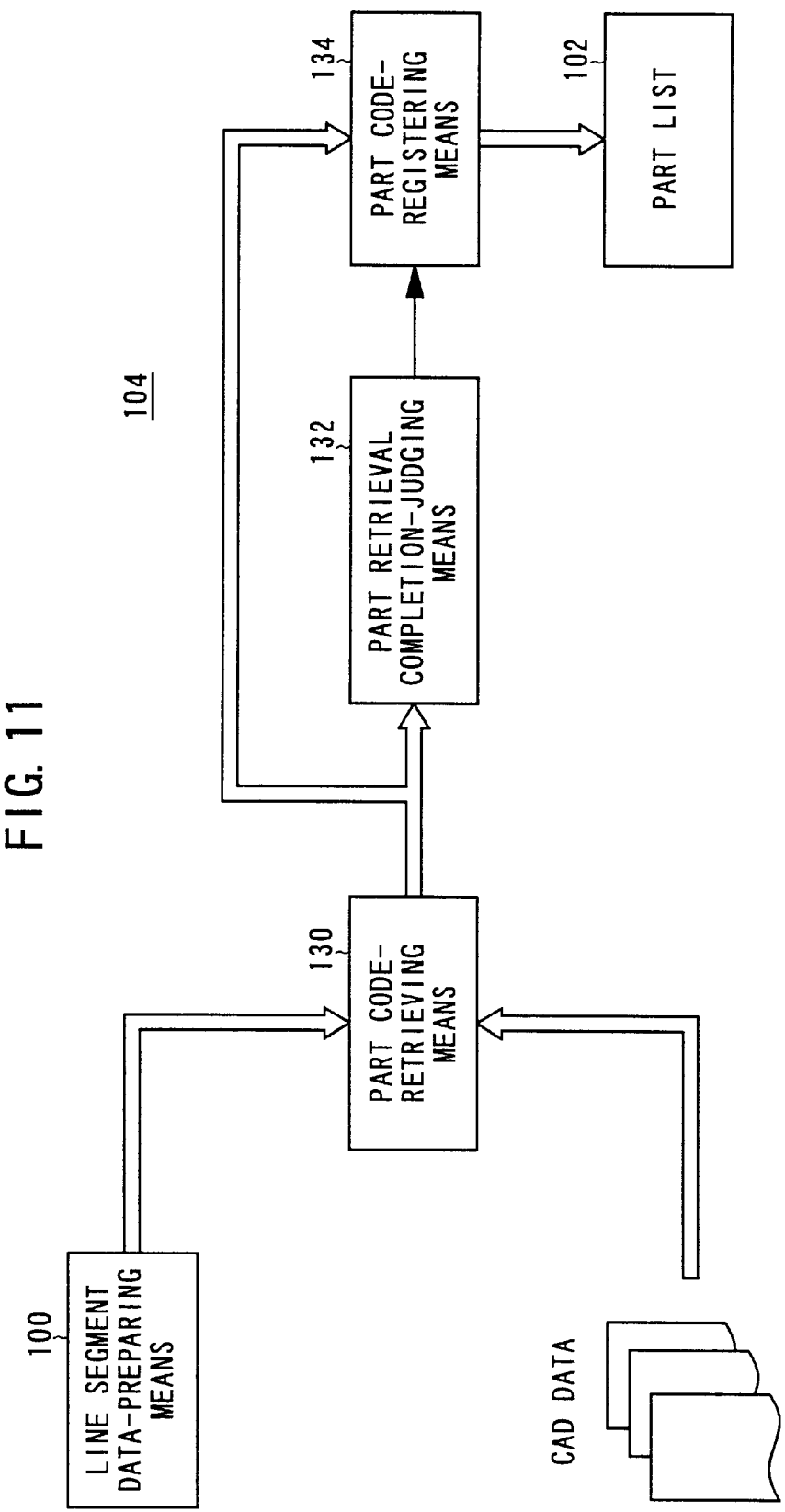
FIG. 11 shows a functional block diagram illustrating an arrangement of a part list-preparing means.

As shown in FIG. 11, the part list-preparing means 104 comprises a part code-retrieving means 130 for retrieving, from the CAD data, an ith part code of part codes on the CAD data included in the line segment data prepared by the line segment data-preparing means 100, a part retrieval completion-judging means 132 for judging whether or not all retrieval for the part code is completed, and a part code-registering means 134 for successively registering the part code retrieved by the part code-retrieving means 130 with the part list 102.

Figure 12:
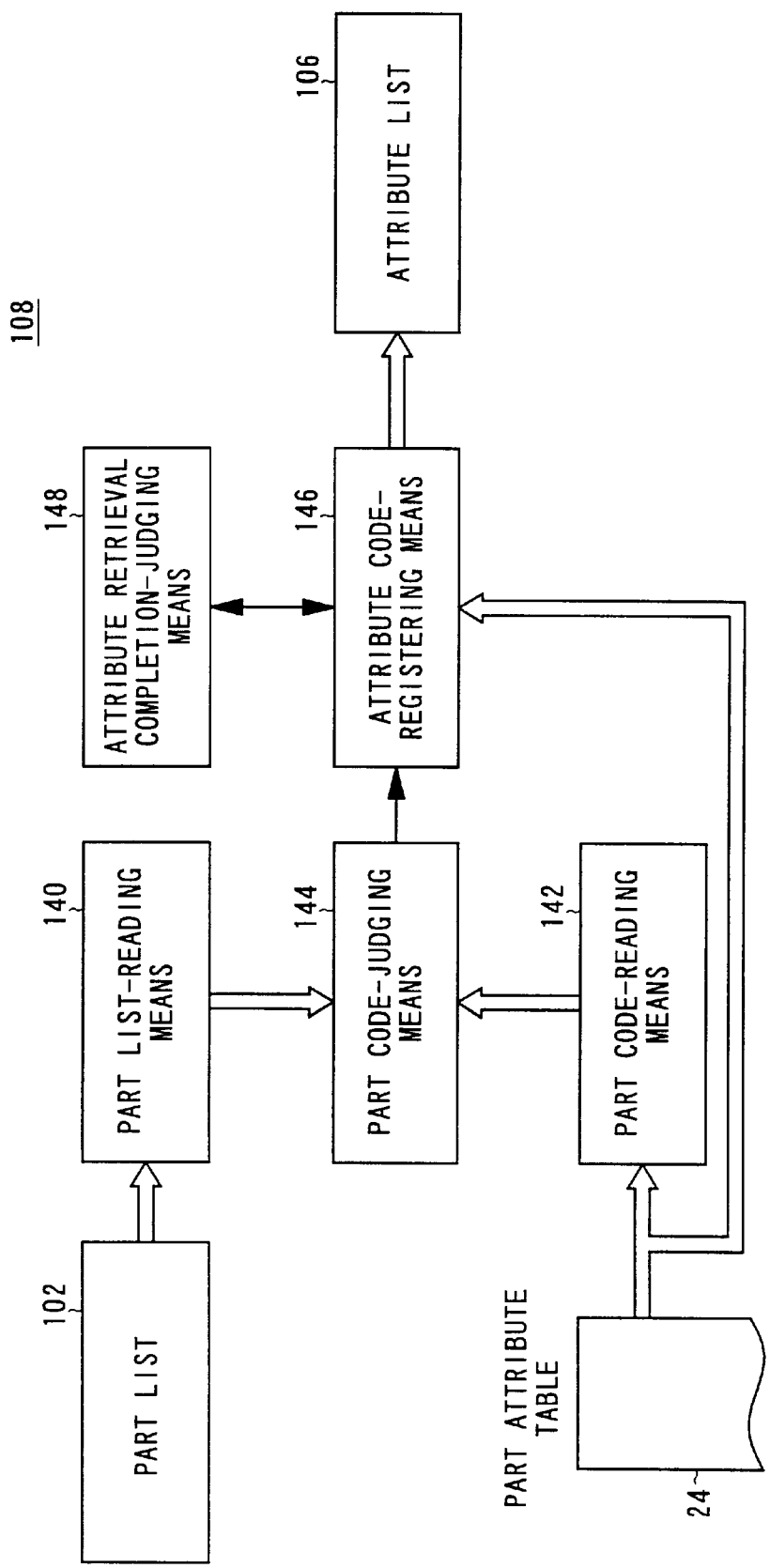
FIG. 12 shows a functional block diagram illustrating an arrangement of an attribute list-preparing means.

As shown in FIG. 12, the attribute list-preparing means 108 comprises a part list-reading means 140 for successively reading the part code from the part list 102, a part code-reading means 142 for reading the part code from the respective records in the part attribute table 26, a part code-judging means 144 for judging whether or not the part code is coincident, an attribute code-registering means 146 for reading the attribute code (the material quality code and the plate thickness code) from the concerning record in the part attribute table 26 and making registration with the attribute list 106, and an attribute retrieval completion-judging means 148 for judging whether or not all retrieval for the attribute code is completed.

Figure 13:
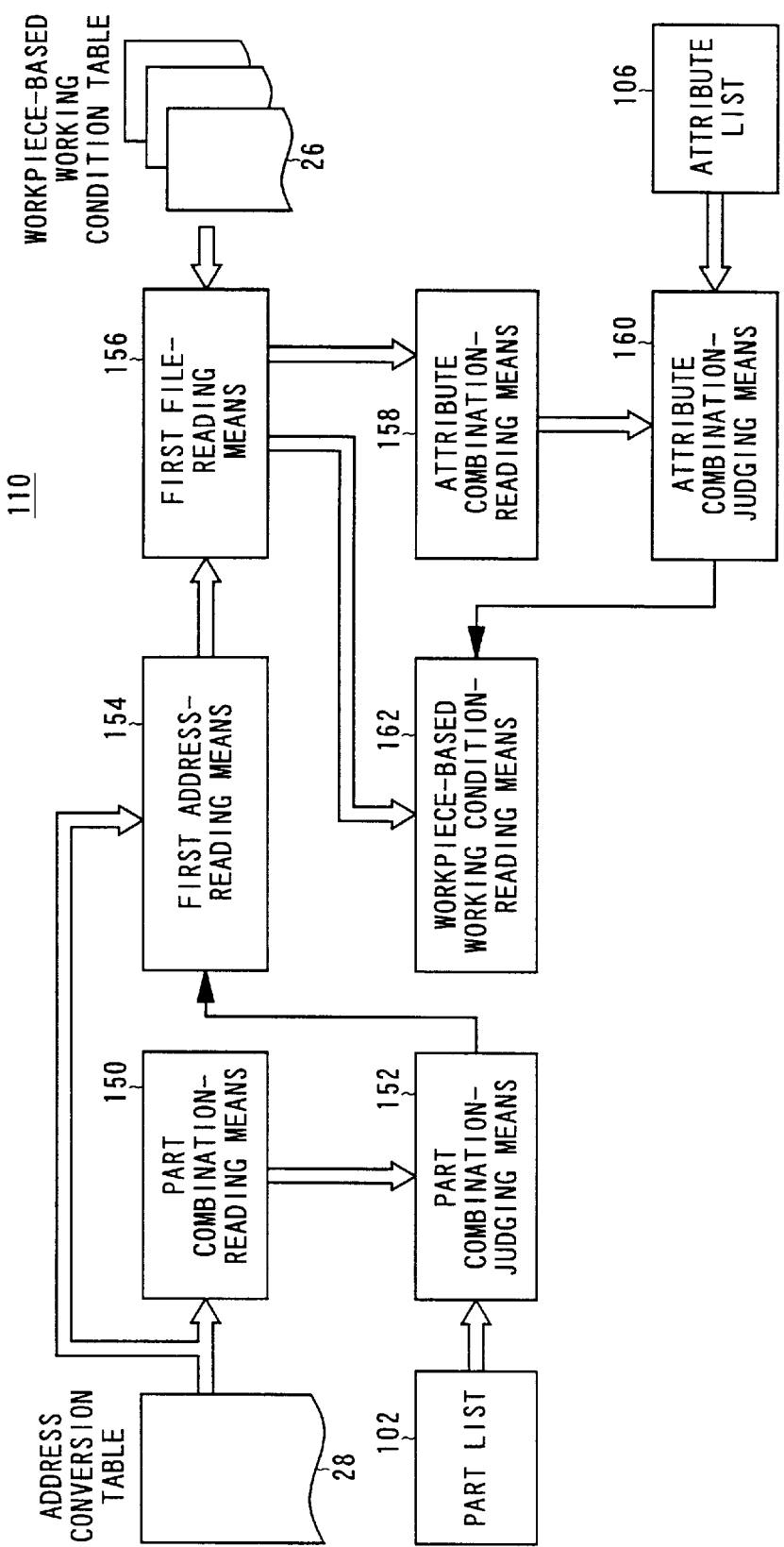
FIG. 13 shows a functional block diagram illustrating an arrangement of a workpiece-based working condition-retrieving means.

As shown in FIG. 13, the workpiece-based working condition-retrieving means 110 comprises a part combination-reading means 150 for reading the combination of the part codes from the respective records in the address conversion table 30, a part combination-judging means 152 for judging whether or not the combination pattern of the part codes read by the part combination-reading means 150 is coincident with the combination pattern of the part codes registered with the part list 102, a first address-reading means 154 for reading the head storage address stored in the concerning record in the address conversion table 30, a first file-reading means 156 for reading the file corresponding to the head storage address read by the first address-reading means 154, of the file group for constructing the workpiece-based working condition table 28, an attribute combination-reading means 158 for reading the combination of the attribute codes from the file read by the first file-reading means 156, an attribute combination-judging means 160 for judging whether or not the combination pattern of the attribute codes on the attribute list 106 is coincident with the combination pattern of the attribute codes read by the attribute combination-reading means 158, and a workpiece-based working condition-reading means 162 for reading the workpiece-based working condition from the file read by the first file-reading means 156.

Figure 14:
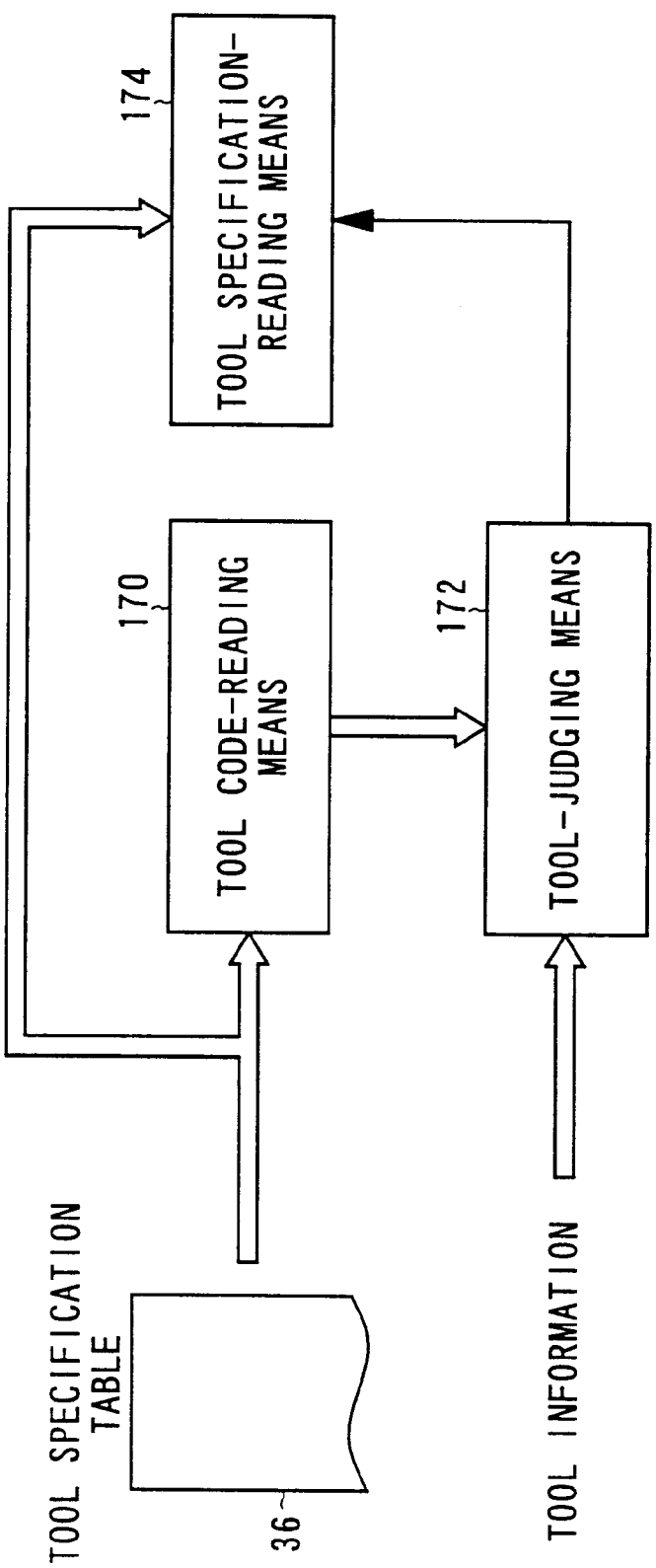
FIG. 14 shows a functional block diagram illustrating an arrangement of a tool specification-retrieving means.

As shown in FIG. 14, the tool specification-retrieving means 112 comprises a tool code-reading means 170 for reading the tool code from the respective records in the tool specification table 36, a tool-judging means 172 for judging whether or not the tool is appropriate for the robot which is the objective for preparing the present teaching data D, and a tool specification-reading means 174 for reading the specifications of the tool from the concerning record in the tool specification table 36.

Figure 15:
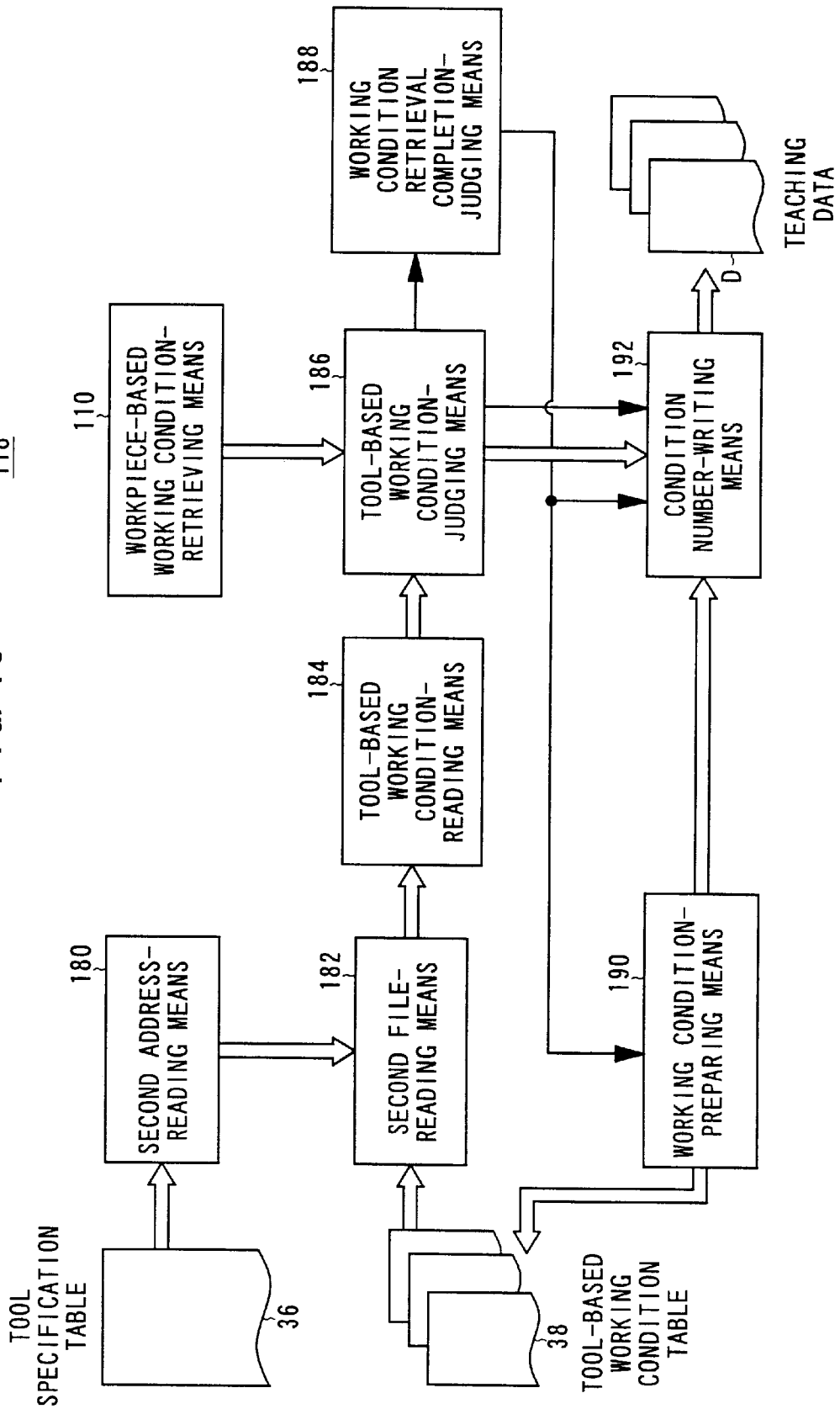
FIG. 15 shows a functional block diagram illustrating an arrangement of a tool-based working condition-retrieving and registering means.

As shown in FIG. 15, the tool-based working condition-retrieving and registering means 118 comprises a second address-reading means 180 for reading the head storage address stored in the concerning record in the tool specification table 36, a second file-reading means 182 for reading the file corresponding to the head storage address read by the second address-reading means 180, of the file group for constructing the tool-based working condition table 38, a tool-based working condition-reading means 184 for reading the tool-based working condition from the respective records in the read file, a tool-based working condition-judging means 186 for judging whether or not the workpiece-based working condition retrieved by the workpiece-based working condition-retrieving means 110 is suitable for the tool-based working condition read by the tool-based working condition-reading means 184, a working condition retrieval completion-judging means 188 for judging whether or not all retrieval for the tool-based working condition is completed, a working condition-preparing means 190 for registering the working condition with a new record in the concerning file, and a condition number-writing means 192 for writing the present condition number in the concerning region in the teaching data D.

Next, the processing action of the teaching data-preparing and processing means 90 will be explained on the basis of flow charts shown in FIGS. 16 to 21.

Figure 16:
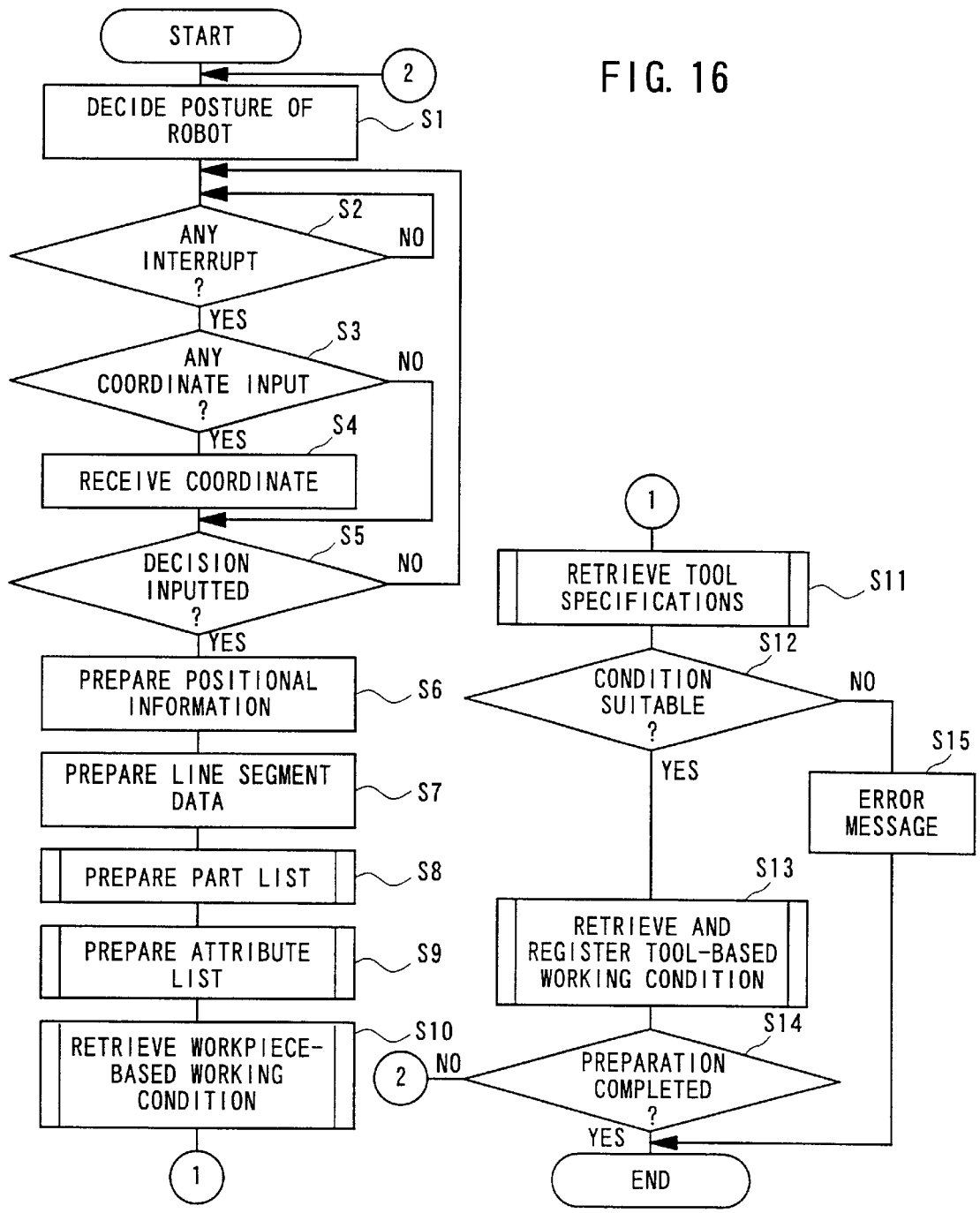
FIG. 16 shows a flow chart illustrating a processing action of the teaching data-preparing and processing means.

At first, in a step S1 shown in FIG. 16, the posture-deciding means 92 (see FIG. 10) is used to decide the posture of the logical robot model displayed on the monitor 18. Next, in a step S2, the coordinate-receiving means 94 (see FIG. 10) is used to judge whether or not there is any data input from the key input device 50 or the coordinate input device 52. The step S2 is repeated until the data is inputted. That is, the system is waiting for the data input.

If the data is inputted from the key input device 50 or the coordinate input device 52, the routine proceeds to the next step S3 to judge whether or not the inputted data is coordinate data by the aid of the coordinate-receiving means 94. If the input data is coordinate data, the routine proceeds to the next step S4 to receive the inputted coordinate data by the aid of the coordinate-receiving means 94.

Figure 22:
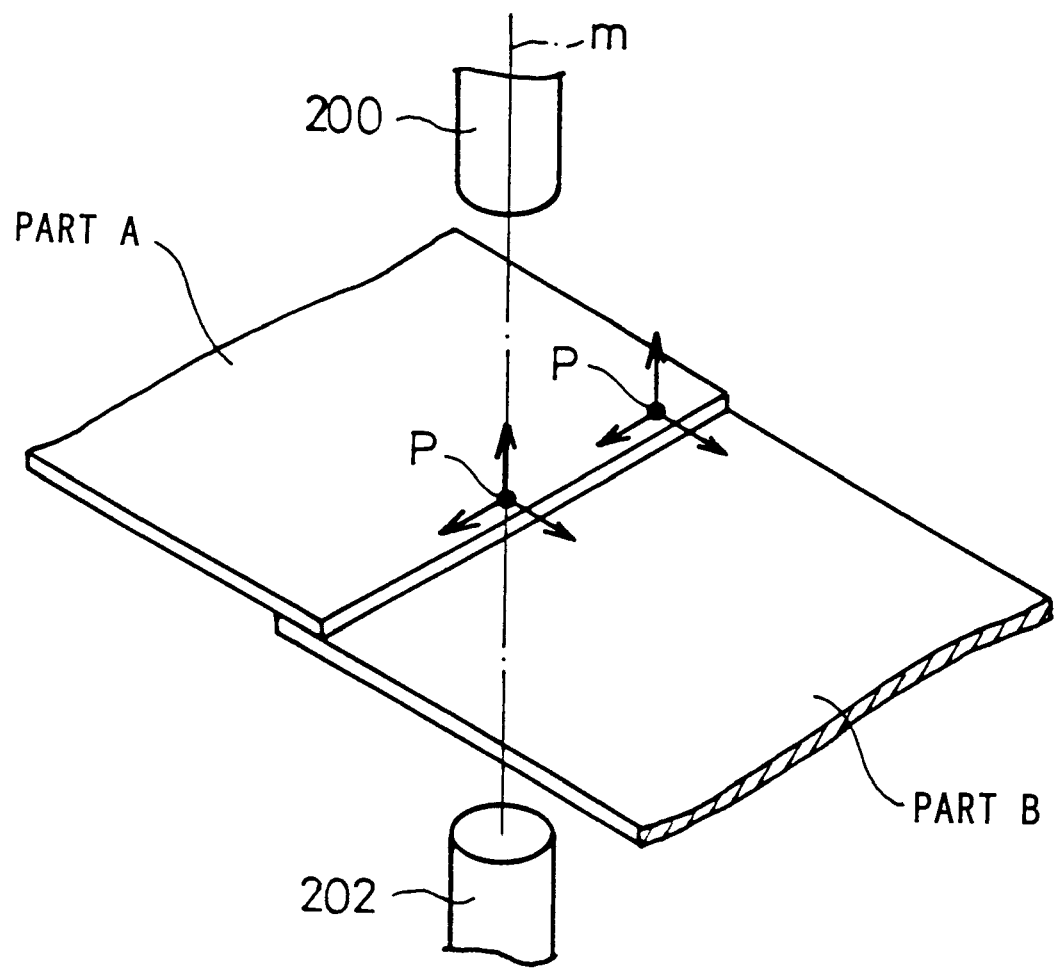
FIG. 22 illustrates the principle which underlies when parts are retrieved by the aid of the part list-preparing means.

If it is judged that no coordinate input is given in the step S3, or at the stage at which the process in the step S4 is completed, the routine proceeds to the next step S5 to judge whether or not the input data from the key input device 50 or the coordinate input device 52 is decided instruction concerning the welding point P as shown in FIG. 22, by the aid of the decision-judging means 96 (see FIG. 10). If the input data is the decided instruction concerning the welding point P, the routine proceeds to the next step S6 to prepare positional information on the basis of the posture of the logical robot model decided by the posture-deciding means 92 and the coordinates decided as the welding point P, by the aid of the positional information-preparing means 98 (see FIG. 10). The prepared positional information is registered with the teaching data D (see FIG. 8).

Next, in a step S7, the line segment data-preparing means 100 (see FIG. 10) is used to determine the line segment data concerning a line segment between the tip of the movable electrode 200 and the tip of the fixed electrode 202, included in a line m drawn in the pressure-applying direction relative to the movable electrode 200 and the fixed electrode 202 from the coordinates decided as the welding point P as shown in FIG. 22.

Figure 17:
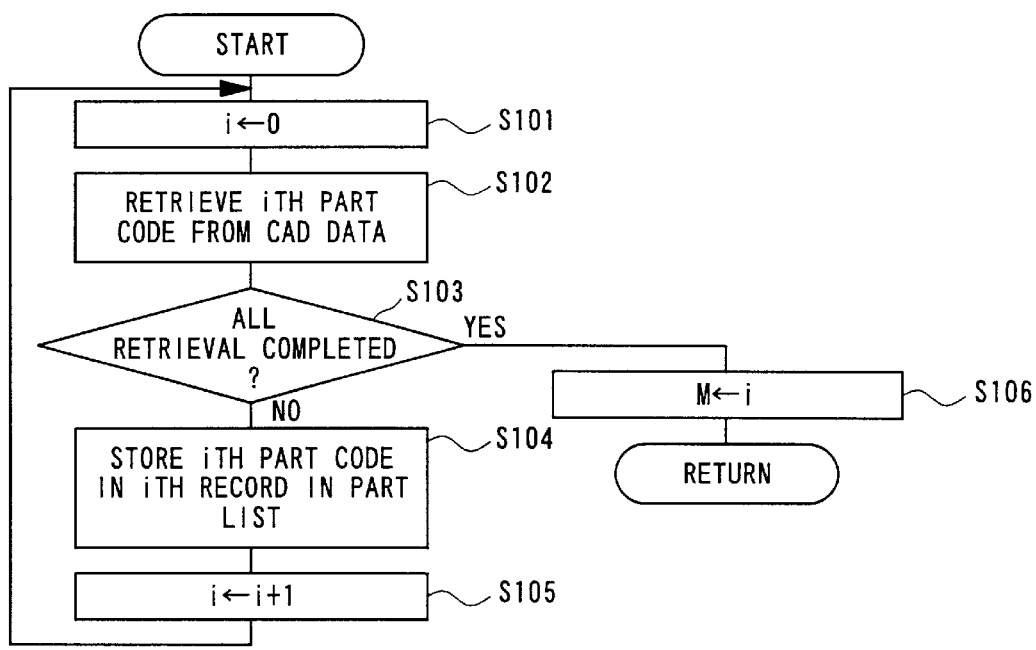
FIG. 17 shows a flow chart illustrating a processing action of the part list-preparing means.

Next, in a step S8, the routine enters the part list-preparing means (part list-preparing subroutine) 104. The process in the part list-preparing subroutine 104 is executed as shown in FIG. 17. At first, in a step S101, an initial value "0" is stored in an index register i which is used to retrieve or register the part code so that the index register i is initialized.

Next, in a step S102, the part code-retrieving means 130 (see FIG. 11) is used to retrieve the ith part code from the CAD data, of the part codes on the CAD data included in the line segment data prepared by the line segment data-preparing means 100. With reference to the illustration shown in FIG. 22, the respective part codes are retrieved for the part A and the part B which exist between the movable electrode 200 and the fixed electrode 202 concerning the welding point P.

Next, in a step S103, the part retrieval completion-judging means 132 is used to judge whether or not all retrieval for the part code is completed. If the retrieval is not completed, the subroutine proceeds to the next step S104 to register the part code retrieved by the part code-retrieving means 130 in the ith record in the part list 102 by the aid of the part code-registering means 134.

Next, in a step S105, the value of the index register i is updated by +1. After that, the subroutine returns to the step S102 to perform retrieval for the next part code and registration with the part list 102.

If it is judged in the step S103 that all retrieval for the part code is completed, the subroutine proceeds to the next step S106 so that the present value of the index register i is defined to be a part retrieval number M. Thus, the part list-preparing means 104 comes to an end.

Figure 18:
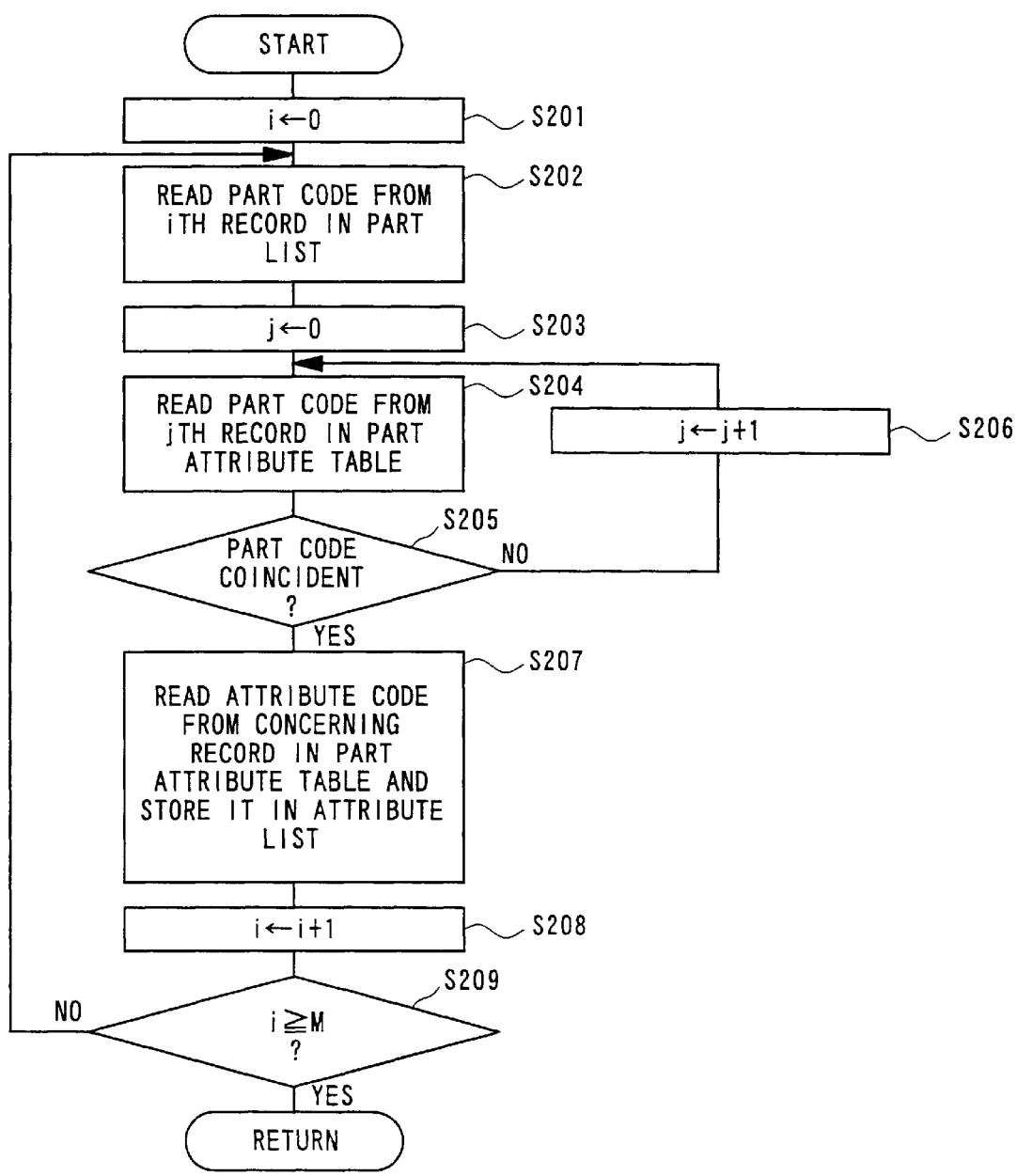
FIG. 18 shows a flow chart illustrating a processing action of the attribute list-preparing means.

Next, the subroutine returns to the main routine shown in FIG. 16. In the next step S9, the routine enters the attribute list-preparing means (subroutine) 108. The process in the attribute list-preparing subroutine 108 is executed as shown in FIG. 18. At first, in a step S201, an initial value "0" is stored in an index register i for retrieving the part list to initialize the index register i.

Next, in a step S202, the part list-reading means 140 (see FIG. 12) is used to read the part code from the ith record in the part list 102.

Next, in a step S203, an initial value "0" is stored in an index register j for retrieving the attribute list to initialize the index register j.

Next, in a step S204, the part code-reading means 142 (see FIG. 12) is used to read the part code from the jth record in the part attribute table 26. Next, in a step S205, the part code-judging means 144 (see FIG. 12) is used to judge whether or not the part code read by the part list-reading means 140 is coincident with the part code read by the part code-reading means 142. If the part code is not coincident with each other, the subroutine proceeds to a step S206 to update the value of the index register j by +1. After that, the subroutine proceeds to the step S204 to execute the process in the step S204 and the followings. That is, the part code in the next record in the part attribute table 26 is read to judge whether or not the read part code is coincident with the part code registered in the jth record in the part list 102.

If it is judged in the step S205 that the part code is coincident with each other, the subroutine proceeds to the next step S207 to read the attribute code from the concerning record in the part attribute table 26 by the aid of the attribute code-registering means 146. The read attribute code is stored in the ith record in the attribute list 106.

Next, in a step S208, the value of the index register i is updated by +1. After that, in the next step S209, the attribute retrieval completion-judging means 148 is used to judge whether or not all retrieval for the attribute code is completed. This judgement is made depending on whether or not the value of the index register i is not less than the part retrieval number M.

If all retrieval for the attribute code is not completed, the subroutine returns to the step S202 to repeat the process in the step S202 and the followings. That is, the process is executed such that the part code is read from the next record in the part list 102, and the attribute code corresponding to the part code is registered with the attribute list 106.

If it is judged in the step S209 that all retrieval for the attribute code is completed, the attribute list-preparing subroutine 108 comes to an end.

Figure 19:
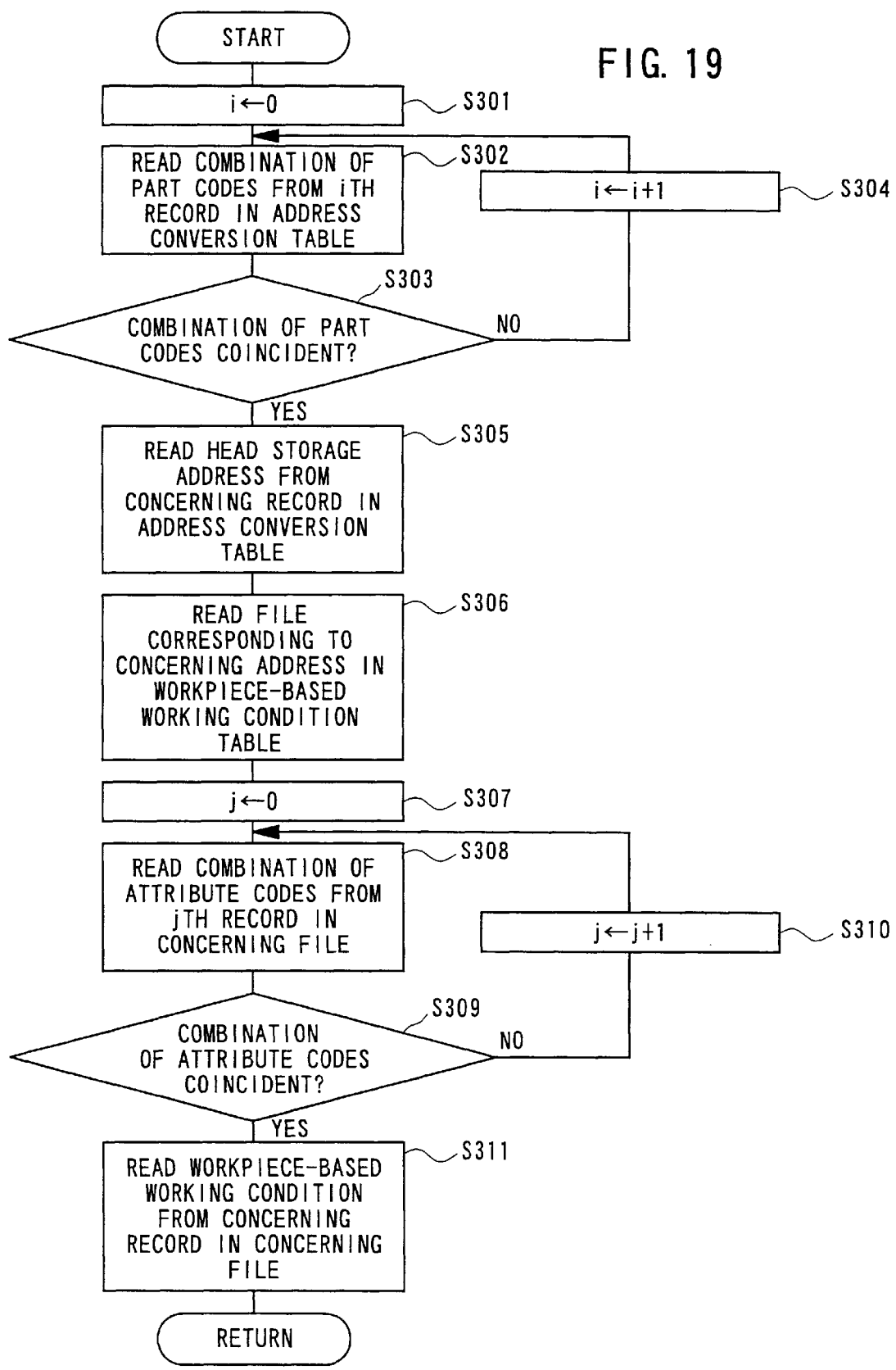
FIG. 19 shows a flow chart illustrating a processing action of the workpiece-based working condition-retrieving means.

Next, the subroutine returns to the main routine shown in FIG. 16. In the next step S10, the routine enters the workpiece-based working condition-retrieving means (workpiece-based working condition-retrieving subroutine) 110. The process in the workpiece-based working condition-retrieving subroutine 110 is executed as shown in FIG. 19. At first, in a step S301, an initial value "0" is stored in an index register i for retrieving the address conversion table to initialize the index register i.

Next, in a step S302, the part combination-reading means 150 (see FIG. 13) is used to read the combination pattern of the part codes from the ith record in the address conversion table 30.

Next, in a step S303, the part combination-judging means 152 (see FIG. 13) is used to judge whether or not the combination pattern of the part codes read by the part combination-reading means 150 is coincident with the combination pattern of the part codes registered in the part list 102.

If the combination pattern of the part codes is not coincident with each other, the subroutine proceeds to a step S304 to update the value of the index register i by +1. After that, the subroutine proceeds to the step S302 to execute the process in the step 302 and the followings. That is, the combination pattern of the part codes in the next record in the address conversion table 30 is read to judge whether or not the read pattern is coincident with the combination pattern of the part codes registered in the part list 102.

If it is judged in the step S303 that the combination pattern of the part codes is coincident with each other, the subroutine proceeds to the next step S305 to read the head storage address stored in the concerning record from the address conversion table 30 by the aid of the first address-reading means 154 (see FIG. 13).

Next, in a step S306, the first file-reading means 156 (see FIG. 13) is used to read the file corresponding to the head storage address read in the step S305, from the file group for constructing the workpiece-based working condition table 28.

Next, in a step S307, an initial value "0" is stored in an index register j for retrieving the workpiece-based working condition to initialize the index register j.

Next, in a step S308, the attribute combination-reading means 158 (see FIG. 13) is used to read the combination pattern of the attribute codes from the jth record in the file.

Next, in a step S309, the attribute combination-judging means 160 (see FIG. 13) is used to judge whether or not the combination pattern of the attribute codes on the attribute list 106 is coincident with the combination pattern of the attribute codes read by the attribute combination-reading means 158.

If the combination pattern of the attribute codes is not coincident with each other, the subroutine proceeds to a step S310 to update the value of the index register j by +1. After that, the subroutine proceeds to the step S308 to execute the process in the step S308 and the followings. That is, the combination pattern of the attribute codes in the next record in the concerning file is read to judge whether or not the read combination pattern is coincident with the combination pattern of the attribute codes registered in the attribute list 106.

If it is judged in the step S309 that the combination pattern of the attribute codes is coincident with each other, the subroutine proceeds to the next step S311 to read the workpiece-based working condition from the concerning record in the concerning file by the aid of the workpiece-based working condition-reading means 162 (see FIG. 13). The workpiece-based working condition-retrieving subroutine 110 comes to an end at the stage at which the process in the step S311 is completed.

Figure 20:
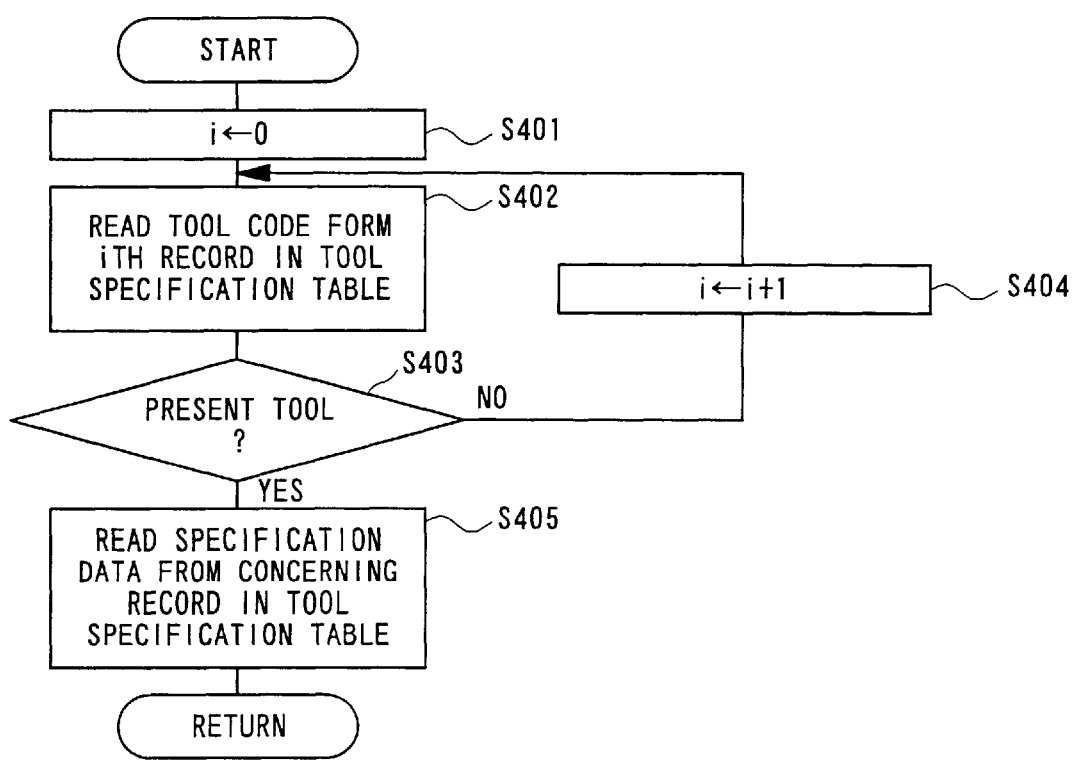
FIG. 20 shows a flow chart illustrating a processing action of the tool specification-retrieving means.

Next, the subroutine returns to the main routine shown in FIG. 16. The routine enters the next tool specification-retrieving means (tool specification-retrieving subroutine) 112. The process in the tool specification-retrieving subroutine 112 is executed as shown in FIG. 20. At first, in a step S401, an initial value "0" is stored in an index register i for retrieving the tool specification table to initialize the index register i.

Next, in a step S402, the tool code-reading means 170 (see FIG. 14) is used to read the tool code from the ith record in the tool specification table 36.

Next, in a step S403, the tool-judging means 172 (see FIG. 14) is used to judge whether or not the tool code is a code which indicates the tool appropriate for the robot as the objective for preparing the present teaching data D.

If it is judged that the tool code does not correspond to the present tool, the subroutine proceeds to a step S404 to update the value of the index register j by +1. After that, the subroutine proceeds to the step S402 to execute the process in the step S402 and the followings. That is, the tool code in the next record in the tool specification table 36 is read to judge whether or not the tool code makes coincidence with the present tool.

If it is judged in the step S403 that the tool code makes coincidence, the subroutine proceeds to the next step S405 to read the tool specification data from the concerning record in the tool specification table 36 by the aid of the tool specification-reading means 174 (see FIG. 14). The tool specification-retrieving subroutine 112 comes to an end at the stage at which the process in the step S405 is completed.

Next, the subroutine returns to the main routine shown in FIG. 16. In the next step S12, the tool specification-judging means 114 (see FIG. 10) is used to judge whether or not the workpiece-based working condition retrieved by the workpiece-based working condition-retrieving means 110 is suitable for the specifications of the present tool. For example, if the welding current value of the workpiece-based working condition (see FIG. 3) is not more than the maximum allowable welding current value of the tool specifications (see FIG. 5), and the pressure-applying force of the workpiece-based working condition (see FIG. 3) is not more than the pressure-applying force of the tool specifications (see FIG. 5), then it is judged that the retrieved workpiece-based working condition is "suitable". If any result other than the above is obtained, it is judged that the retrieved workpiece-based working condition is "unsuitable".

Figure 21:
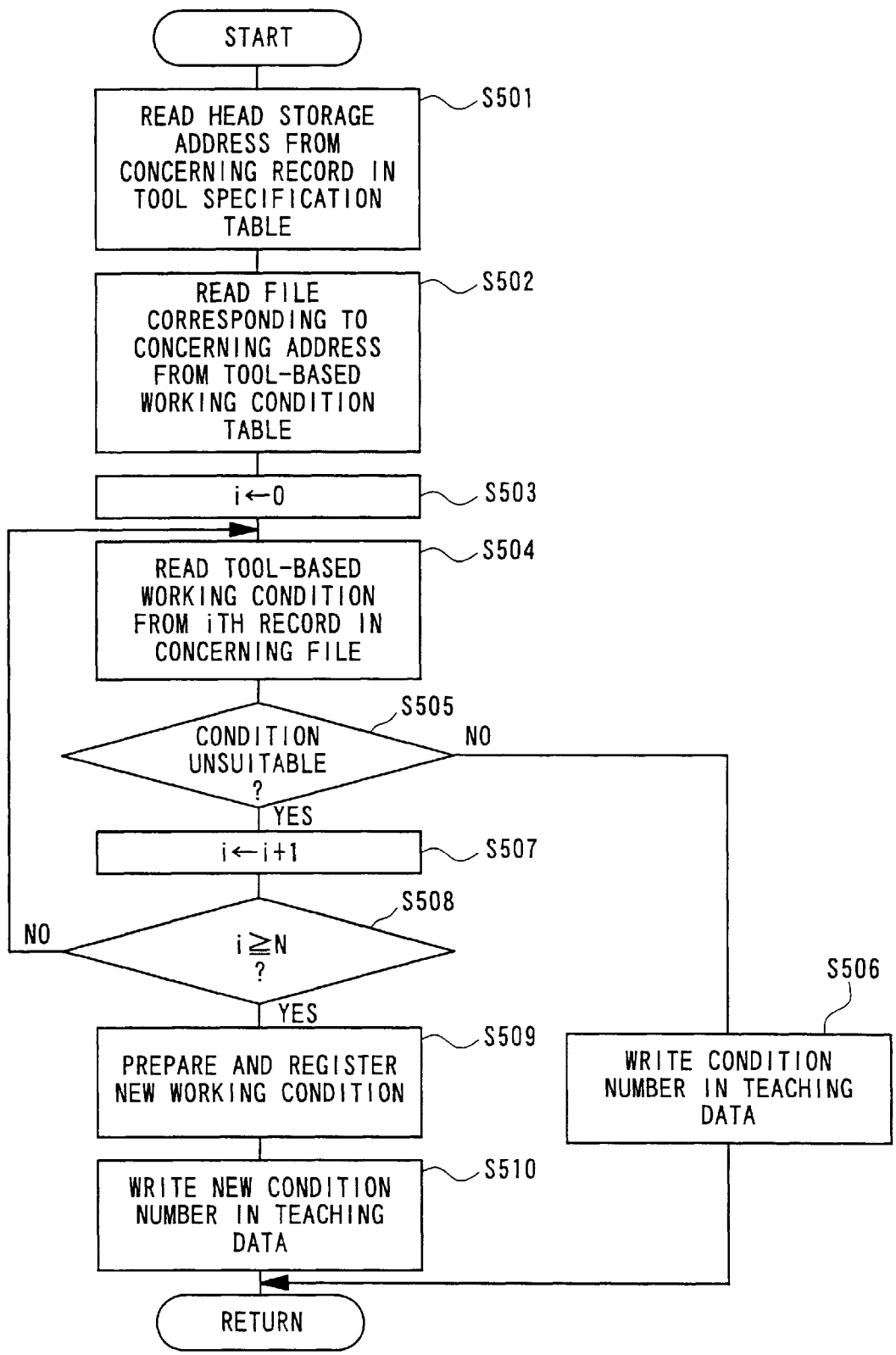
FIG. 21 shows a flow chart illustrating a processing action of the tool-based working condition-retrieving and registering means.

If it is judged in the step S12 that the retrieved workpiece-based working condition is "suitable", then the routine proceeds to the next step S13, and it enters the tool-based working condition-retrieving and registering means (tool-based working condition-retrieving and registering subroutine) 118. The process in the tool-based working condition-retrieving and registering subroutine 118 is executed as shown in FIG. 21. At first, in a step S501, the second address-reading means 180 (see FIG. 15) is used to read the head storage address from the concerning record in the tool specification table 36 retrieved by the tool specification-retrieving means 112 (see FIG. 10).

Next, in a step S502, the second file-reading means 182 (see FIG. 15) is used to read the file corresponding to the read head storage address, of the file group for constructing the tool-based working condition table 38.

Next, in a step S503, an initial value "0" is stored in an index register i for retrieving the tool-based working condition to initialize the index register i.

Next, in a step S504, the tool-based working condition-reading means 184 (see FIG. 5) is used to read the tool-based working condition from the ith record in the concerning file.

Next, in a step S505, the tool-based working condition-judging means 186 (see FIG. 15) is used to judge whether or not the workpiece-based working condition retrieved by the workpiece-based working condition-retrieving means 110 (see FIG. 10) is suitable for the tool-based working condition read by the tool-based working condition-reading means 184. For example, if the welding current value of the workpiece-based working condition (see FIG. 3) is within the range between the minimum allowable welding current value and the maximum allowable welding current value of the tool-based working condition (see FIG. 6), it is judged that the retrieved working condition is "suitable". If any result other than the above is obtained, it is judged that the retrieved working condition is "unsuitable".

If it is judged in the step S505 that the retrieved working condition is "suitable", the subroutine proceeds to the next step S506 to write the condition number stored in the concerning record or the present value of the index register i into the teaching data D (see FIG. 8) by the aid of the condition number-writing means 192 (see FIG. 15).

If it is judged in the step S505 that the retrieved working condition is "unsuitable", the subroutine proceeds to a step S507 to update the value of the index register i by +1. After that, the subroutine proceeds to the next step S508 to judge whether or not all retrieval for the tool-based working condition is completed by the aid of the working condition retrieval completion-judging means 188 (see FIG. 15). This judgment is made depending on whether or not the value of the index register i is not less than the working condition registration number N.

If it is judged in the step S505 that the retrieved working condition is "suitable" before the value of the index register i becomes not less than the working condition registration number N, the subroutine proceeds to the step S506 described above. If the value of the index register i becomes not less than the working condition registration number N, and it is judged that the retrieved working condition is "unsuitable" for all of the tool-based working conditions registered in the concerning file, then the subroutine proceeds to a step S509 to register the working condition with a new record in the concerning file by the aid of the working condition-preparing means 190 (see FIG. 15). Specifically, the welding current value of the workpiece-based working condition (see FIG. 3) retrieved at present is registered as the maximum allowable welding current value and the minimum allowable welding current value (see FIG. 6) in the new record in the concerning file. The initial values (default values) are registered as the release time and the pressure-applying time (see FIG. 6) for the new record.

Next, in a step S510, the condition number-writing means 192 is used to write the new condition number or the present value of the index register i into the teaching data D.

The process in the tool-based working condition-retrieving and registering subroutine 118 comes to an end at the stage at which the process in the step S506 or the process in the step S510 is completed.

Next, the subroutine returns to the main routine shown in FIG. 16. In the next step S14, the request termination-judging means 120 (see FIG. 10) is used to judge whether or not there is any termination of the request for preparation of the teaching data D. If the request for preparation is given, the routine returns to the step S1 to repeat the process in the step S1 and the followings. That is, the positional information at the next welding point P and the welding condition (tool-based working condition) concerning the welding point P are registered with the teaching data D.

If it is judged in the step S12 that the workpiece-based working condition retrieved by the workpiece-based working condition-retrieving means 110 (see FIG. 10) is not suitable for the specifications of the present tool, the routine proceeds to a step S15 to output, to the monitor 18, a message of the contents, for example, that it is necessary to change the tool because the specifications of the tool are not suitable, by the aid of the error message output means 116 (see FIG. 10).

If it is judged in the step S14 that the request for preparation is terminated, or at the stage at which the error message output process is completed in the step S15, the teaching data-preparing and processing means 90 comes to an end.

The positional information and the condition number indicating the welding condition optimum for the positional information are registered with the respective steps in the teaching data D respectively at the point of time of completion of the process performed by the teaching data-preparing and processing means 90.

The prepared teaching data D is downloaded to the actual robot 16 by the aid of the data transfer apparatus 24. When the actual robot 16 is operated, the robot controller 22 makes control so that the tip point of the tool is moved on the basis of the positional information contained in the teaching data D. The robot controller 22 reads the tool-based working condition from the tool-based working condition table 38 (see FIG. 6) on the basis of the condition number registered in the teaching data D to control, for example, the welding current outputted from the welding transformer and the pressure-applying force exerted by the movable electrode 200 (see FIG. 22) in conformity with the working condition.

As described above, in the off-line teaching system 10 according to the embodiment of the present invention, the tool-based working condition is automatically decided at the welding point P when the operator designates the welding point P by using the pointing device such as a mouse for the image of the workpiece displayed on the monitor 18. Accordingly, it is possible to efficiently realize reduced operation time required for the off-line teaching.

The reasonable working condition can be set on the off-line teaching apparatus 20. Therefore, it is possible to decrease the resetting process based on the use of the actual robot 16 as less as possible. Thus, it is possible to greatly reduce the time and the number of steps required to perform the revising operation at the working site.

Especially, in the embodiment of the present invention, the part list-preparing means 104 is used to retrieve the codes of the one or more parts intersecting the straight line drawn in the pressure-applying direction from the coordinates on the basis of the coordinate data of the welding point P, from the CAD data of the workpiece. Therefore, the one or more part codes concerning the welding point P can be automatically deduced at the point of time at which the welding point P is designated.

The attribute list-preparing means 108 is used to obtain the attribute codes concerning the one or more part codes retrieved by using the part list-preparing means 104 while making collation with the part attribute table 26. Therefore, it is possible to automatically obtain the codes (attribute codes) which indicate the material quality and the plate thickness of the respective parts concerning the welding point P on the basis of the one or more part codes retrieved by the part list-preparing means 104.

The workpiece-based working condition-retrieving means 110 is operated as follows. That is, the file included in the workpiece-based working condition table 28, which corresponds to the present welding point P, is specified in accordance with the combination pattern of the one or more part codes prepared by the part list-preparing means 104. The workpiece-based working condition is retrieved and decided from the specified file by using the key of the combination pattern of the attribute codes prepared by the attribute list-preparing means 108. Therefore, the workpiece-based working condition can be easily decided according to the combination pattern of the parts concerning the welding point P. Thus, it is possible to achieve the automatic setting for the workpiece-based working condition by using the software.

The tool specification-retrieving means 112 is used to compare the workpiece-based working condition retrieved by the workpiece-based working condition-retrieving means 110 with the specifications of the tool to be used by the objective robot. If the result of comparison is "suitable", the tool-based working condition-retrieving and registering means 118 is used to extract the condition number suitable for the decided workpiece-based working condition from the tool-based working condition table 38. The condition number is registered with the teaching data D. Therefore, the working condition, which is not appropriate for the specifications of the tool to be used by the objective robot, is not set as the tool-based working condition. The tool-based working condition, which is appropriate for the workpiece-based working condition, can be automatically established.

When the tool-based working condition-retrieving and registering means 118 is operated, if the tool-based working condition table 38 does not include the number which conforms to the decided workpiece-based working condition, then the tool-based working condition suitable for the decided workpiece-based working condition is newly registered with the tool-based working condition table 38, and the new condition number obtained during this process is registered with the teaching data D. Therefore, the optimum tool-based working condition can be automatically set by using the software while referring to the specifications of the tool and the workpiece-based working condition.

The embodiment described above is illustrative of the application to the off-line teaching for the welding gun robot. Besides, the present invention is also easily applicable to painting robots and transport robots.

It is a matter of course that the method for setting a tool-based working condition in off-line teaching according to the present invention is not limited to the embodiment described above, which may be embodied in other various forms without deviating from the gist or essential characteristics of the present invention.

As explained above, the method for setting a tool-based working condition in off-line teaching according to the present invention lies in the feature comprising a first step of designating, for a workpiece on CAD data, a working point for performing working for the workpiece; a second step of retrieving one or more parts concerning the designated working point; a third step of obtaining attributes necessary for the working performed for the retrieved one or more parts; a fourth step of deciding a workpiece-based working condition on the basis of the obtained attributes; and a fifth step of retrieving the tool-based working condition suitable for the workpiece-based working condition from specifications of a tool if the decided workpiece-based working condition is included in the specified specifications of the tool, so that teaching data is reflected thereby.

Accordingly, it is possible to automatically set an optimum tool-based working condition while referring to specifications of a tool and workpiece-based working conditions, and it is possible to efficiently realize reduced operation time required for the off-line teaching.

Further, it is possible to set a reasonable welding condition in off-line, it is possible to decrease the resetting process based on the use of an actual robot as less as possible, and it is possible to greatly reduce the time and the number of steps required to perform the revising operation at the working site.

What is claimed is:

1. A method for setting a tool-based working condition in off-line teaching, comprising:
- a first step of designating, for a workpiece on CAD data, a working point for performing working for said workpiece;
- a second step of retrieving one or more parts concerning said designated working point;
- a third step of obtaining attributes necessary for said working concerning said retrieved one or more parts;
- a fourth step of deciding a workpiece-based working condition on the basis of said obtained attributes; and
- a fifth step of retrieving said tool-based working condition suitable for said workpiece-based working condition from specifications of a tool if said decided workpiece-based working condition is included in said specified specifications of said tool, so that teaching data is reflected thereby.

2. The method for setting said tool-based working condition in said off-line teaching according to claim 1, wherein in said first step, said working point is designated by using a coordinate input device for an image of said workpiece displayed on a monitor.

3. The method for setting said tool-based working condition in said off-line teaching according to claim 2, wherein in said second step, said one or more parts, which intersect a straight line drawn from coordinates of said working point in a working direction on the basis of coordinate data of said working point, are retrieved from said CAD data of said workpiece.

4. The method for setting said tool-based working condition in said off-line teaching according to claim 1, wherein said third step further comprises the steps of:
- using a part attribute table which makes it possible to refer to a plate thickness and a material quality of said part on the basis of a name of said part; and
- obtaining plate thicknesses and material qualities concerning said one or more parts retrieved in said second step while making collation with said part attribute table.

5. The method for setting said tool-based working condition in said off-line teaching according to claim 4, wherein said fourth step further comprises the steps of:
- using a workpiece-based working condition table which has files corresponding to a number of combination patterns of said parts and which enables each of said files to refer to a working condition concerning a certain combination on the basis of a combination pattern of said material quality and said plate thickness;
- specifying said file in accordance with a combination of said one or more parts obtained in said second step, included in said workpiece-based working condition table; and
- retrieving and deciding said workpiece-based working condition from said specified file by using a key of a combination pattern of said plate thickness and said material quality obtained in said third step.

6. The method for setting said tool-based working condition in said off-line teaching according to claim 1, wherein said fifth step further comprises the steps of:
- comparing said workpiece-based working condition decided in said fourth step with said specifications of said tool of an objective robot; and
- using a tool-based working condition table in which said tool-based working conditions are registered in a numerical order if a result of comparison indicates that said decided workpiece-based working condition is included in said specifications of said tool, so that a number suitable for said decided workpiece-based working condition is extracted from said tool-based working condition table to record said number in said teaching data.

7. The method for setting said tool-based working condition in said off-line teaching according to claim 6, wherein if there is no number which is suitable for said decided workpiece-based working condition, in said tool-based working condition table, then a tool-based working condition, which is suitable for said decided workpiece-based working condition, is newly registered with said tool-based working condition table, and a new number designated during this process is recorded in said teaching data.

* * * * *

UNITED STATES PATENT AND TRADEMARK OFFICE
CERTIFICATE OF CORRECTION

PATENT NO.   : 6,256,552 B1
DATED        : July 3, 2001
INVENTOR(S)  : Shinji Aoki et al.

It is certified that error appears in the above-identified patent and that said Letters Patent is hereby corrected as shown below:

<u>Title page,</u>
Item "[73] Assignee:", please correct the name of the assignee from "Honda Giken Kabushiki Kaisha" to -- Honda Giken Kogyo Kabushiki Kaisha --.

Signed and Sealed this

Second Day of April, 2002

*Attest:*

JAMES E. ROGAN
*Attesting Officer*   *Director of the United States Patent and Trademark Office*